United States Patent [19]
Tsuchida et al.

[11] Patent Number: 5,760,503
[45] Date of Patent: Jun. 2, 1998

[54] STEPPING MOTOR HAVING ROTOR SECTIONS WITH PERMANENT MAGNETS DISPOSED THEREON AT A CONSTANT PITCH

[75] Inventors: Nuio Tsuchida, 5-227-16, Kurosawadai, Midori-ku, Nagoya, Aichi-Ken, Japan; Kenichi Fukuoka, Obu, Japan

[73] Assignees: Toyoda Koki Kabushiki Kaisha, Kariya, Japan; Nuio Tsuchida, Nagoya, Japan

[21] Appl. No.: 668,182

[22] Filed: Jun. 21, 1996

[30] Foreign Application Priority Data

Jun. 21, 1995 [JP] Japan ................... 7-179321

[51] Int. Cl.⁶ .................. H02K 37/10; H02K 37/14
[52] U.S. Cl. ........................................ 310/49 R
[58] Field of Search ................. 310/49 R, 164, 310/162, 156

[56] References Cited

U.S. PATENT DOCUMENTS

| | | | |
|---|---|---|---|
| 3,855,486 | 12/1974 | Binder et al. | 310/49 |
| 4,406,958 | 9/1983 | Palmero et al. | 310/49 R |
| 4,739,201 | 4/1988 | Brigham et al. | 310/49 R |
| 5,128,570 | 7/1992 | Isozaki | 310/49 R |
| 5,132,603 | 7/1992 | Yoshimoto | 318/696 |
| 5,410,200 | 4/1995 | Sakamoto et al. | 310/49 R |

Primary Examiner—Clayton E. LaBalle
Attorney, Agent, or Firm—Oblon, Spivak, McClelland, Maier & Neustadt, P.C.

[57] ABSTRACT

A stepping motor includes a stator and a rotor. The stator has pole teeth projecting from the inner surface at a constant pitch. The rotor has first through fourth rotor sections, and permanent magnets are embedded into the outer surface of each of the first through fourth rotor sections at a pitch equal to the pitch of the pole teeth. Two coils are provided in the stator so as to generate looped magnetic fluxes in the stator. A first offset corresponding to one half of the pitch of the permanent magnets is provided between each permanent magnet of the first rotor section and a correspond permanent magnet of the second rotor section, and a second offset equal to the first offset is provided between each permanent magnet of the third rotor section and a correspond permanent magnet of the fourth rotor section. Further, a third offset corresponding to a quarter of the pitch of the permanent magnets is provided between each permanent magnet of the second rotor section and a correspond permanent magnet of the third rotor section. When current is supplied to the coils, driving forces are generated at the permanent magnets of the first and second rotor sections as well as at the permanent magnets of the third and fourth rotor sections. The rotor is rotated by these driving forces.

13 Claims, 15 Drawing Sheets

FIRST ROTOR         SECOND ROTOR

STEPPING MOTOR HAVING ROTOR SECTIONS WITH PERMANENT MAGNETS DISPOSED THEREON AT A CONSTANT PITCH

BACKGROUND OF THE INVENTION

1. Field of the Invention

The present invention relates to a stepping motor, and more particularly to a stepping motor capable of directly driving a finger joint, etc., of a robot hand, without using a reducer.

2. Discussion of Related Art

Conventionally, a stepping motor has been used to drive components of electrical equipment, such as a head of a printer. Such a stepping motor has an advantage that its rotational angle can be controlled by supplying pulse current thereto without using feedback control. However, due to its structure, the size of the motor must be increased so as to generate a large torque. Accordingly, such a stepping motor has not been used to directly drive a finger joint of a robot hand.

Stepping motors can be categorized as being a VR type, a PM type, and an HB type. FIG. 1 shows a conventional VR type stepping motor. In this stepping motor, a rotor 120 has pole teeth 122, while a stator 130 has pole teeth 132. A first-phase coil 140A, a second-phase coil 140B, and a third-phase coil 140C are wound around the pole teeth 132 such that the coils run along the inner circumference of the stator 130. When a switch Sa is closed to excite the first-phase coil 140A, a first group of pole teeth 132 of the stator 130 around which the first-phase coil 140A is wound attract pole teeth 122 of the rotor 120 facing the first group of pole teeth 132, so that the rotor 120 rotates. When a switch Sb is closed to excite the second-phase coil 140B, a second group of pole teeth 132 of the stator 130 around which the second-phase coil 140B is wound attract pole teeth 122 of the rotor 120 facing the second group of the pole teeth 132, so that the rotor 120 further rotates in the same manner. By repeating this operation, the rotor 120 rotates stepwise 15° at a time.

However, in conventional VR type and HB type stepping motors, a large torque cannot be produced, because they produce rotational force only by attraction between the pole teeth of the rotor and the pole teeth of the stator. Also, their structures in which coils are wound around the pole teeth of the stator make it difficult to wind coils around the pole teeth using a machine. In addition, since coils are wound around the pole teeth of the stator, the distance between adjacent pole teeth (pole pitch) of the stator cannot be decreased. Accordingly, there is a large space which cannot be used to generate rotational torque, which makes it difficult to reduce the size of the motor.

PM type stepping motors utilize attractive and repulsive forces. Of such motors, a salient-pole type stepping motor has a plurality of pole teeth on its stator, as in VR type stepping motors. In this salient-pole type stepping motor, since coils are wound around the pole teeth of the stator, the pole pitch of the stator cannot be decreased. Therefore, the salient-pole type stepping motor has a large space which cannot be utilized in generating rotational torque, so the motor cannot generate a large torque. Also, in another PM type stepping motor (craw pole type PM motor), two cylindrical members are disposed to form a stator. Each of the cylindrical members has a tooth portion at its longitudinal end, and the tooth portions of the cylindrical members are meshed with each other to complete the stator. Coils are wound around the outer circumference of the stator. Further, a cylindrical rotor formed of a permanent magnet is disposed inside the stator. The outer circumferential surface of the rotor is magnetized such that S poles and N poles are formed alternately in the circumferential direction. In the craw pole type PM motor, since the magnetic flux density at the gap between the stator and the rotor cannot be increased due to the configuration of its magnetic path, it is impossible to increase the output torque.

SUMMARY OF THE INVENTION

An object of the present invention is to solve the above-described problems and to provide an improved stepping motor which can generate a large torque and which can be miniaturized.

Briefly, the present invention provides a stepping motor which has a stator, and a rotor having first and second rotor sections. Permanent magnets are disposed at a constant pitch on the outer circumference or inner circumference of each of the first and second rotor sections. A coil is provided in the stator and wound in the circumferential direction so as to generate looped magnetic fluxes in a plane containing the axis of the stator. The direction of current supplied to the coil is changed during operation. A first interrelation exists between magnetic fluxes generated by the permanent magnets of the first rotor section and magnetic fluxes generated in the stator by the coil. A second interrelation exists between magnetic fluxes generated by the permanent magnets of the second rotor section and magnetic fluxes generated in the stator by the coil. The first interrelation and the second interrelation are offset from each other in the rotational direction.

The present invention also provides a stepping motor which has a cylindrical stator having a plurality of pole teeth projecting from the inner circumference of the stator at a predetermined pitch, and a rotor having first, second, third and fourth rotor sections. Permanent magnets are disposed on the outer circumference of each of the first through fourth rotor sections at a constant pitch. First and second coils are provided in the stator and wound in the circumferential direction so as to generate looped magnetic fluxes in a first portion of the stator facing the first and second rotor sections, and in a second portion of the stator facing the third and fourth rotor sections. The directions of currents supplied to the first and second coils are changed during operation. A first offset is provided between the magnetic interrelation between the permanent magnets of the first rotor section and the pole teeth and the maginetic interrelation between the permanent magnets of the second rotor section and the pole teeth, and a second offset equal to the first offset is provided between the magnetic interrelation between the permanent magnets of the third rotor section and the pole teeth and the magnetic interrelation between the permanent magnets of the forth rotor section and the pole teeth. Further, a third offset is provided between the magnetic interrelation between the permanent magnets of the second rotor section and the pole teeth and the maginietic interrelation between the permanent magnets of the third rotor section and the pole teeth.

The present invention further provides a stepping motor which has a stator having a plurality of pole teeth projecting from the outer circumference of the stator at a predetermined pitch, and a rotor having first, second, third and fourth rotor sections. Permanent magnets are disposed on the inner circumference of each of the first through fourth rotor sections at a pitch equal to the pitch of the pole teeth such that the same poles of the permanent magnets face inward. First and second coils are provided in the stator and wound in the circumferential direction so as to generate looped magnetic fluxes in a first portion of the stator facing the first and second rotor sections, and in a second portion of the stator facing the third and fourth rotor sections. The directions of currents supplied to the first and second coils are changed during operation. A first offset is provided between each permanent magnet of the first rotor section and a correspond permanent magnet of the second rotor section, and a second offset equal to the first offset is provided between each permanent magnet of the third rotor section and a correspond permanent magnet of the fourth rotor section. Further, a third offset is provided between each permanent magnet of the second rotor section and a correspond permanent magnet of the third rotor section.

In the stepping motor according to the present invention, an attractive force and/or a repulsive force is generated at each of the permanent magnets disposed in the rotor sections of the rotor, and these forces are combined to produce a driving force. Accordingly, a large torque can be generated. Further, since the stepping motor according to the present invention employs a structure in which a coil or coils provided in the stator are wound in the circumferential direction, the coil or coils can be easily wound using a machine so as to enhance productivity. Moreover, since the coil or coils are wound in the circumferential direction, the pole pitch can be easily decreased so as to miniaturize the stepping motor. Therefore, it becomes possible to drive directly, without using a reducer, a finger joint, etc., of a robot hand, which have conventionally been driven by a stepping motor containing a reducer.

BRIEF DESCRIPTION OF THE ACCOMPANYING DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 9A and 9B are time charts showing changes in the direction of currents supplied to coils, wherein FIG. 9A shows timing of changing the direction of current supplied to the first coil, while FIG. 9B shows timing of changing the direction of current supplied to the second coil;

FIGS. 10A to 10D are views showing the components of the stepping motor according to the first embodiment, wherein FIG. 10A is a side view of the rotor, FIG. 10B is a front view of the rotor, FIG. 10C is a front view of a permanent magnet, and FIG. 10D is a front view of a stator;

FIGS. 13A and 13B show a stepping motor according to a fourth embodiment of the present invention, wherein FIG. 13A is a cutaway side view, while FIG. 13B is a partial plan view of the stator as viewed from the rotor;

DETAILED DESCRIPTION OF THE PREFERRED EMBODIMENTS

Embodiments of the present invention will now be described with reference to the drawings.

Figure 1:
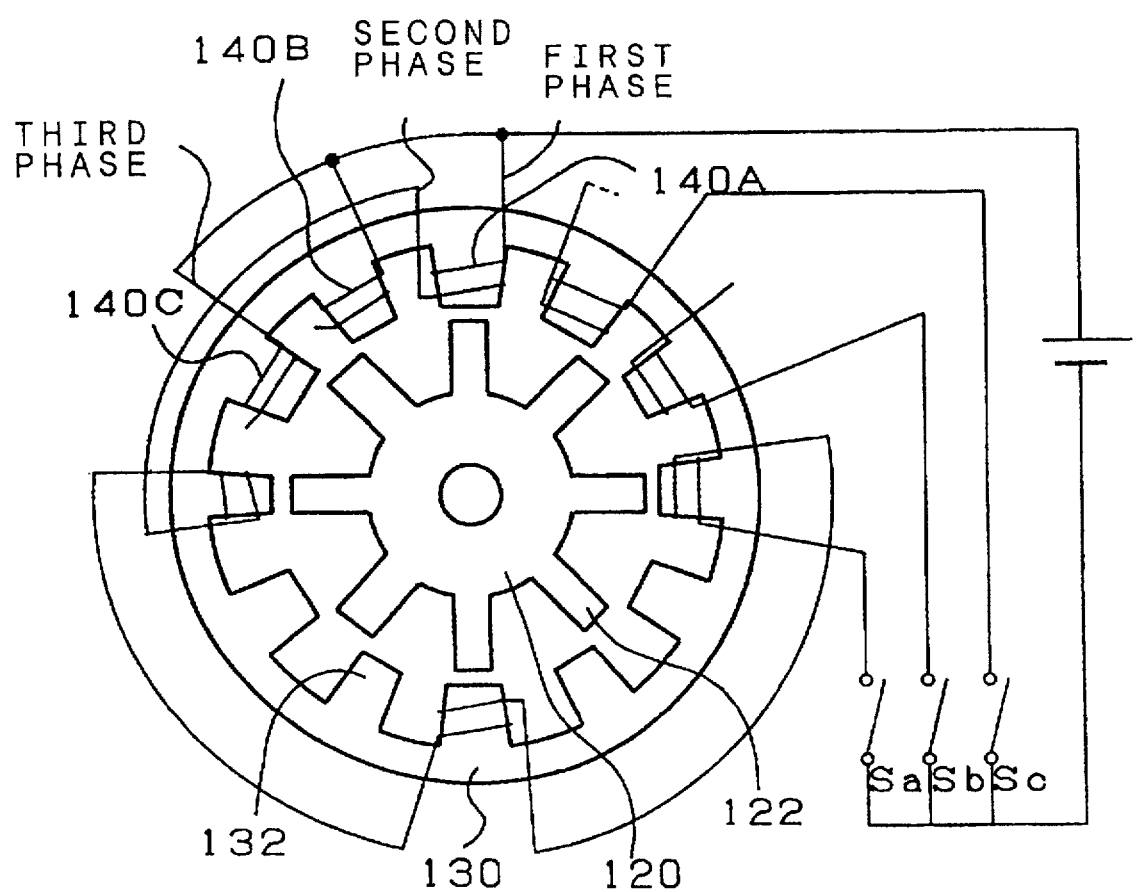
FIG. 1 is an explanatory view showing the structure of a conventional stepping motor.
Figure 2:
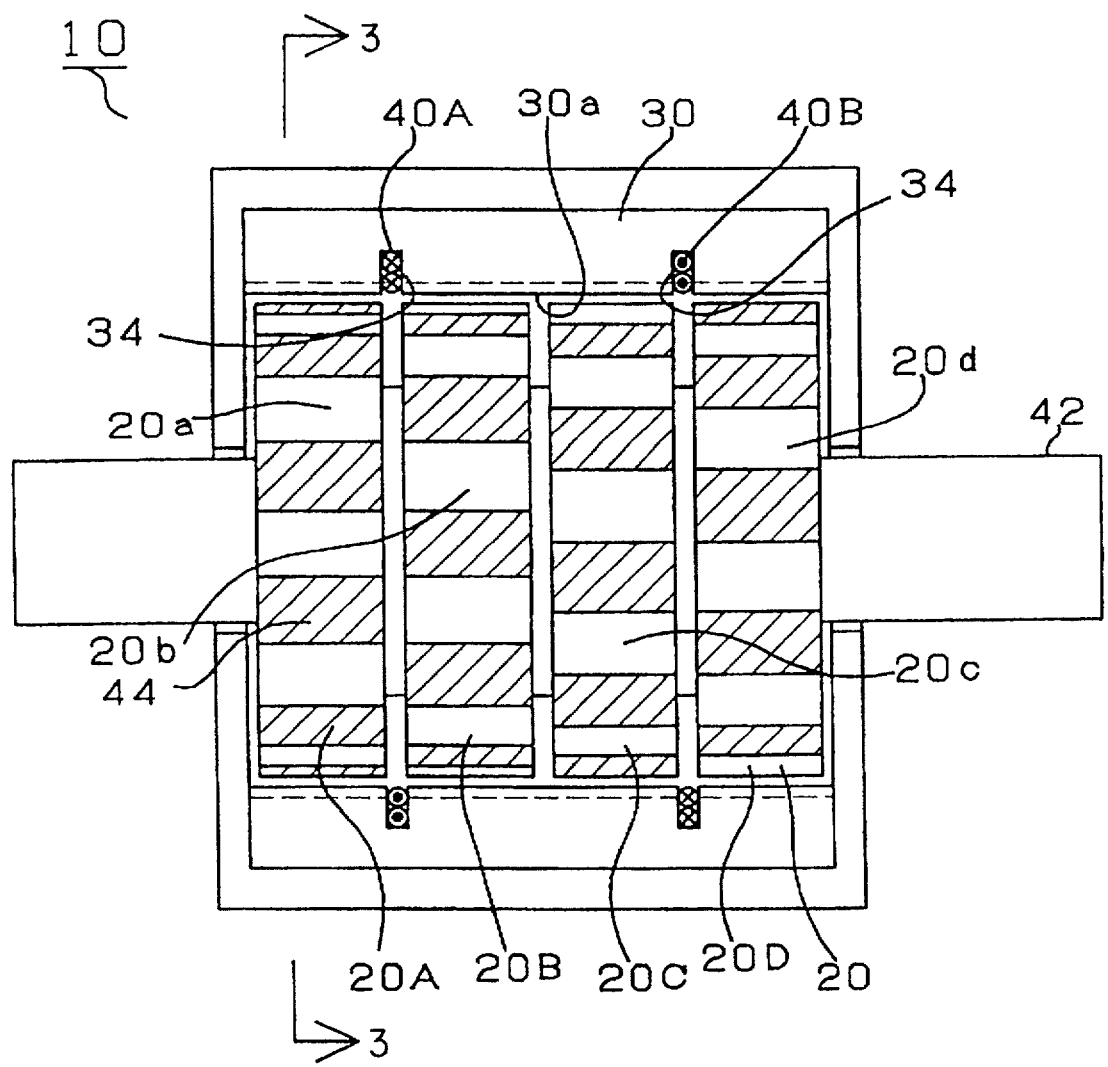
FIG. 2 is a cutaway side view of a stepping motor according to a first embodiment of the present invention.
Figure 3:
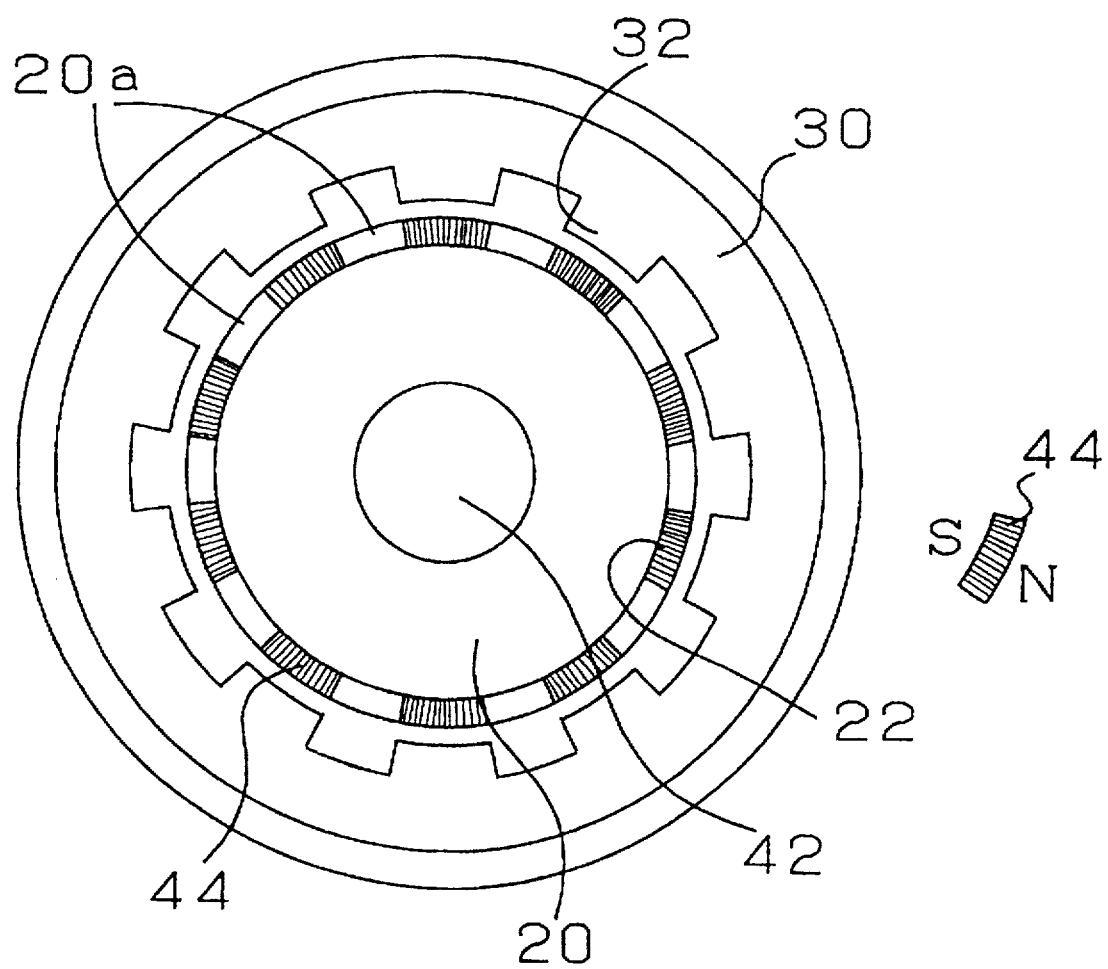
FIG. 3 is a sectional view taken along line A—A in FIG. 2.

FIG. 2 shows a cutaway side view of a stepping motor according to a first embodiment of the present invention, and FIG. 3 shows a sectional view taken along line A—A in FIG. 2. The stepping motor 10 is composed of a stator 30 and a rotor 20, each made of a magnetic material such as iron. The rotor 20 consists of four rotor sections, i.e., first through fourth rotor sections 20A–20D, each having a short cylindrical shape. Each rotor section has a plurality of depressions 22, which are formed at its outer circumference at a constant pitch, as shown in FIG. 3. Permanent magnets 44 are fit into the depressions 22 such that their N poles face outward in the radial direction. As shown in FIG. 2, the first rotor section 20A and the second rotor section 20B are fixed to a shaft 42 such that they are offset from each other in the circumferential direction by one half of the pitch of the permanent magnets 44. Similarly, the third rotor section 20C and the fourth rotor section 20D are fixed to the shaft 42 such that they are offset from each other in the circumferential direction by one half of the pitch of the permanent magnets 44. The first and second rotor sections 20A and 20B are collectively offset from the third and fourth rotor sections 20C and 20D by a quarter of the pitch of the permanent magnets 44.

As shown in FIG. 3, the stator 30 for receiving the rotor 20 is a cylindrical member and at its inner circumference has pole teeth 32 at a pitch equal to the pitch of the permanent magnets 44 of the rotor 20. Two grooves 34 are also formed in the inner circumferential surface 30a of the stator 30 such that one of the grooves 34 faces a portion where the first and second rotor sections 20A and 20B are connected together, while the other of the grooves 34 faces a portion where the third and fourth rotor sections 20C and 20D are connected together. In the grooves 34 are wound first and second coils 40A and 40B, respectively.

Next, referring to FIGS. 4 and 5, a description will be given of magnetic fluxes generated in the stator 30 and forces generated at the permanent magnets 44 due to the magnetic fluxes. When a current is supplied to the first coil 40A in a direction such that the current flows in the direction from the back to front of the paper of FIG. 4 at the upper portion of the first coil 40A, counterclockwise magnetic fluxes M1 are produced in the stator 30 in accordance with the corkscrew rule. Thus, the portion of the stator 30 facing the first rotor section 20A is magnetized with an N pole orientation, while the portion of the stator 30 facing the second rotor section 20B is magnetized with an S pole orientation. Similarly, when a current is supplied to the second coil 40B in a direction such that the current flows from the front to back of the paper of FIG. 4 at the upper portion of the second coil 40B, clockwise magnetic fluxes M2 are produced in the stator 30. Thus, the portion of the stator 30 facing the third rotor section 20C is magnetized with an S pole orientation, while the portion of the stator 30 facing the fourth rotor section 20D is magnetized with an N pole orientation.

Figure 4:
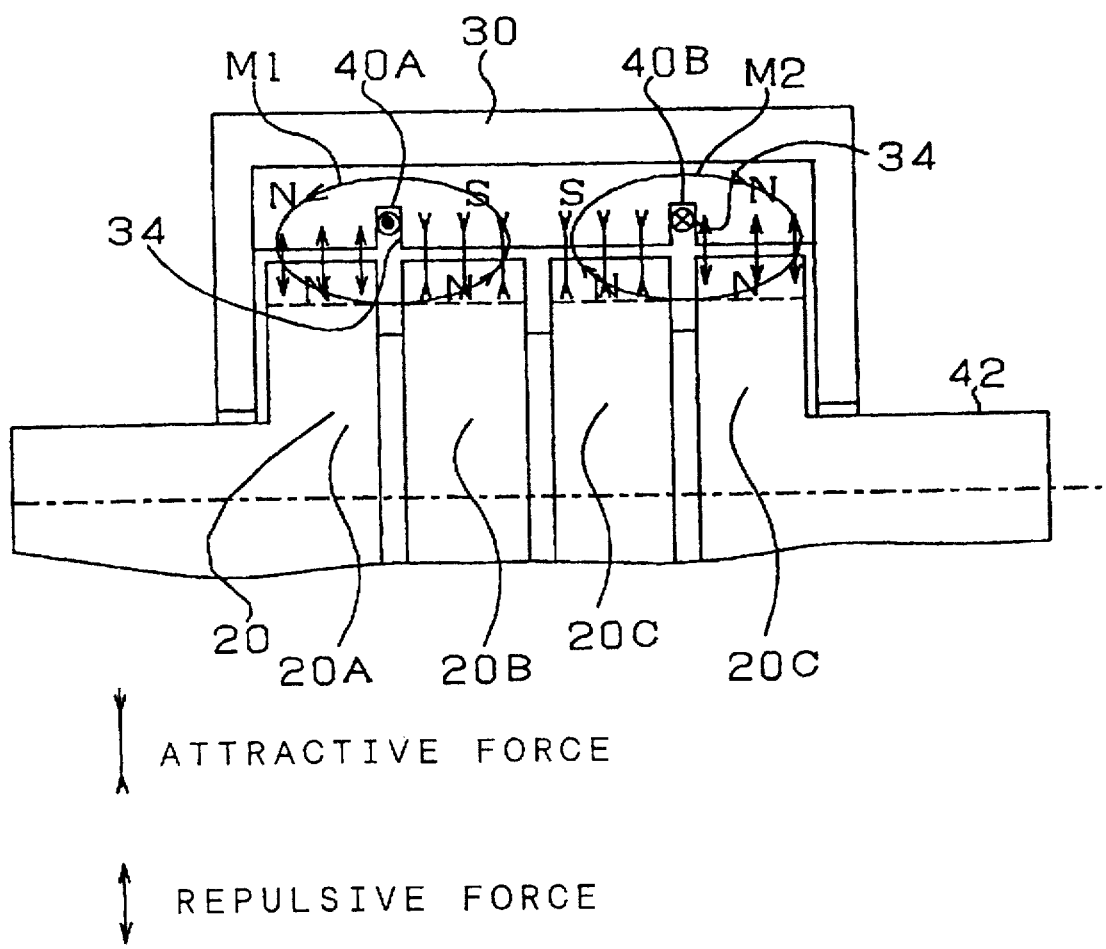
FIGS. 4 and 5 are explanatory views each showing a state in which the stator of the stepping motor according to the first embodiment is magnetized.

When a repulsive force is produced between the N pole formed at the portion of the stator 30 facing the first rotor section 20A and the N poles of the permanent magnets 44 of the first rotor section 20A, as shown in FIG. 4, an attractive force is produced between the N poles of the permanent magnets 44 of the second rotor section 20B and the S pole of the stator 30. Similarly, when an attractive force is produced between the S pole formed at the portion of the stator 30 facing the third rotor section 20C and the N poles of the permanent magnets 44 of the third rotor section 20C, a repulsive force is produced between the N poles of the permanent magnets 44 of the fourth rotor section 20D and the N pole of the stator 30. Although FIG. 4 is depicted such that the attractive forces and repulsive forces produced between the permanent magnets 44 and the pole teeth 32 are in the same plane corresponding to the surface of the paper of FIG. 4, actually they are not produced in the same plane but are offset from one another in the rotational direction of the rotor 20, because the permanent magnets 44 of the first through fourth rotor sections are offset from one another in the rotational direction of the rotor 20.

Figure 5:
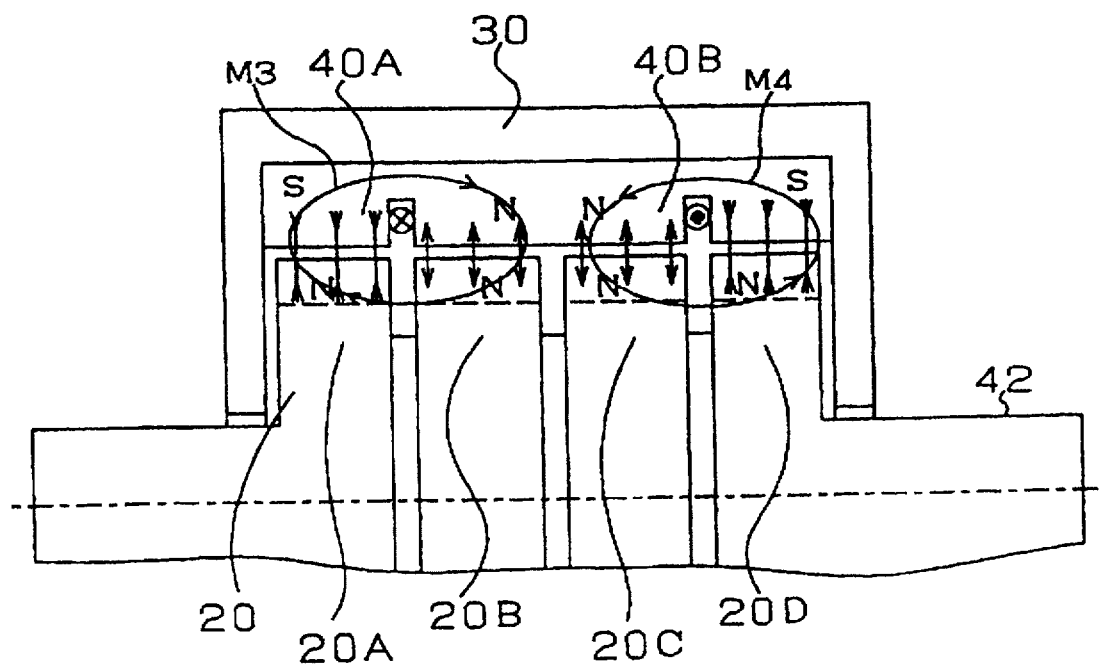

When the directions of the currents supplied to the first and second coils 40A and 40B are reversed, as shown in FIG. 5, i.e., when a current is supplied to the first coil 40A in a direction such that the current flows in the direction from the front to back of the paper of FIG. 5 at the upper portion of the first coil 40A, clockwise magnetic fluxes M3 are produced. Thus, the portion of the stator 30 facing the first rotor section 20A is magnetized with an S pole orientation, while the portion of the stator 30 facing the second rotor section 20B is magnetized with an N pole orientation. Similarly, when a current is supplied to the second coil 40B in a direction such that the current flows from the back to front of the paper of FIG. 5 at the upper portion of the second coil 40A, counterclockwise magnetic fluxes M4 are produced in the stator 30. Thus, the portion of the stator 30 facing the third rotor section 20C is magnetized with an N pole orientation, while the portion of the stator 30 facing the fourth rotor section 20D is magnetized with an S pole orientation. Like FIG. 4, FIG. 5 is depicted such that the attractive forces and repulsive forces produced between the permanent magnets 44 and the pole teeth 32 are in the same plane. However, actually, the attractive and repulsive forces are not produced in the same plane but are offset from one another in the rotational direction of the rotor 20.

When an attractive force is produced between the S pole formed at the portion of the stator 30 facing the first rotor section 20A and the N poles of the permanent magnets 44 of the first rotor section 20A, an repulsive force is produced between the N poles of the permanent magnets 44 of the second rotor section 20B and the N pole of the stator 30. Similarly, when a repulsive force is produced between the N pole formed at the portion of the stator 30 facing the third rotor section 20C and the N poles of the permanent magnets 44 of the third rotor section 20C, an attractive force is produced between the N poles of the permanent magnets 44 of the fourth rotor section 20D and the S pole of the stator 30. As described above, in the stepping motor 10 according to the first embodiment, repulsive forces and attractive forces are produced at all the permanent magnets 44 mounted on the first through fourth rotor sections 20A–20D along the inner circumferential surface of the stator 30.

Figure 6A:
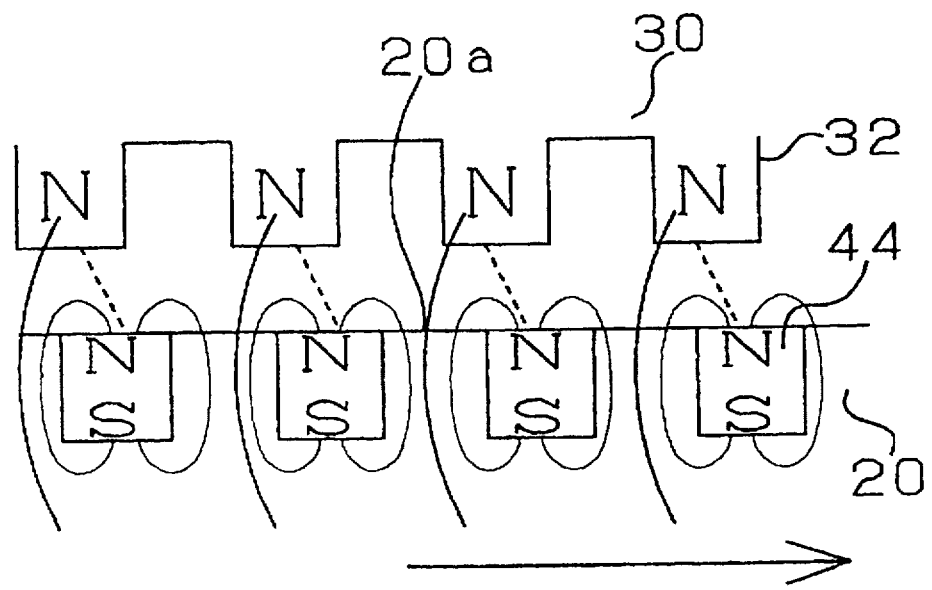
FIGS. 6A and 6B are explanatory diagrams each showing forces generated in the stepping motor according to the first invention.
Figure 6B:
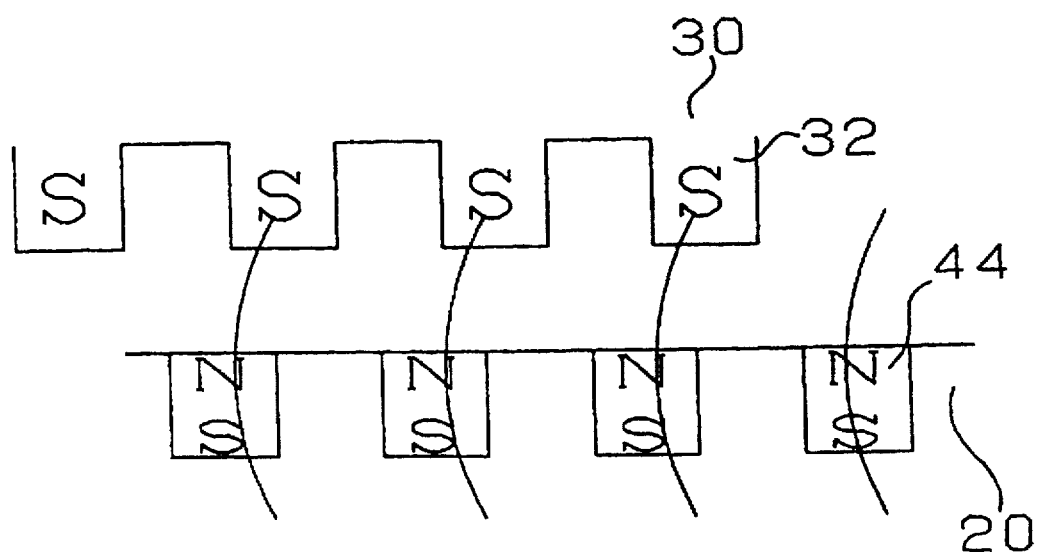

Referring to FIGS. 6A and 6B, a more detailed description will be given of repulsive and attractive forces produced between the rotor 20 and the stator 30. When the pole teeth 32 of the stator 30 have the same polarity as the permanent magnets 44 facing the pole teeth 32, as shown in FIG. 6A, the pole teeth 32 repulse the core 20a of the rotor 20, as in the conventional VR type stepping motor, thereby generating a torque. Lines of magnetic force which are produced by each permanent magnet 44 and which cannot enter the pole teeth 32 form loops passing through the front and back end surfaces of the permanent magnet 44. As a result, a repulsive force is produced between the looped lines of magnetic force and lines of magnetic force passing through the core 20b of the rotor 20. When the pole teeth 32 of the stator 30 have a polarity opposite the permanent magnets 44 facing the pole teeth 32, as shown in FIG. 6B, a torque is generated due to an attractive force produced between the pole teeth 32 and the permanent magnets 44.

Next, referring to FIGS. 7A–7F, a description will be given of the relationship between repulsive forces and attractive forces produced at the first and second rotor sections 20A and 20B. In each of FIGS. 7A–7F, the stator 30 is depicted on the upper side while the first and second rotor sections 20A and 20B are depicted on the lower side. For the sake of clarity, the stator 30, and the first and second rotor sections 20A and 20B are depicted as being flat. Also, it is assumed that the rotor 20 is driven to move rightward in these drawings.

Figure 7A:
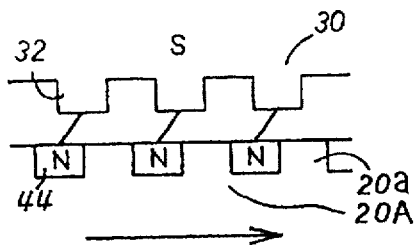
FIGS. 7A to 7F are explanatory diagrams each showing forces generated in the stepping motor according to the first embodiment.
Figure 7A:
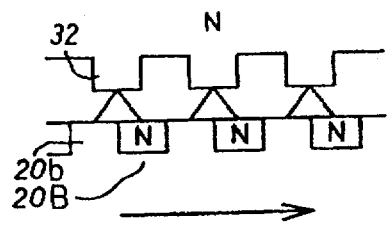

First, a description will be given of an operation wherein a current is supplied to the first coil 40A in the direction shown in FIG. 5. When each permanent magnet 44 of the first rotor 20A is delayed from a corresponding pole tooth 32 of the stator 30 which faces the first rotor 20A and is magnetized with an S pole orientation, as shown in FIG. 7A, an attractive force is produced between the pole teeth 32 and the permanent magnets 44 of the first rotor section 20A, as indicated by solid lines in FIG. 7A. At this time, the portion of the stator 30 facing the second rotor 20B is magnetized with an N pole orientation. Since the second rotor section 20B is offset from the first rotor section 20A by an angle corresponding to ½ pitch, as has been described with reference to FIG. 2, the permanent magnets 44 of the second rotor section 20B advance with respect to the pole teeth 32. Accordingly, attractive forces are produced between the core 20b of the second rotor section 20B while repulsive forces are produced between the permanent magnets 44 and the pole teeth 32 of the stator 30 magnetized with an N-pole orientation, as indicated by broken lines in FIG. 7A. Thus, the rotor 20 generates a driving force in the rightward direction.

Figure 7B:
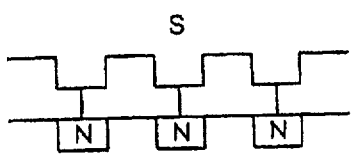
Figure 7B:
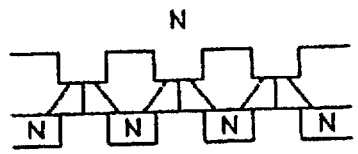

As a result of the attractive forces produced at the first rotor section 20A and the attractive and repulsive forces produced at the second rotor section 20B, the rotor 20 moves to a position where the pole teeth 32 of the stator 30 face the permanent magnets 44 of the first rotor section 20A, as shown in FIG. 7B. At this time, the second rotor section 20B rotates together with the first rotor section 20A to a position where the permanent magnets 44 of the second rotor section 20B are offset from the pole teeth by ½ pitch. In other words, when a current is supplied to the first coil 40A in the direction shown in FIG. 5, the rotor 20 rotates by an amount corresponding to ½ pitch.

Figure 7C:
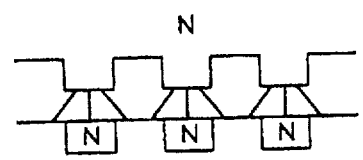
Figure 7C:
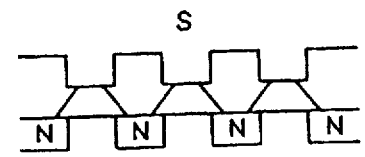
Figure 7D:
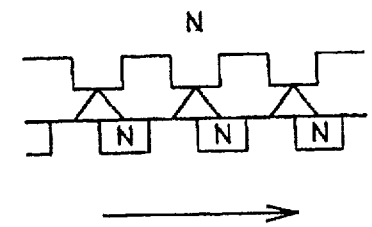
Figure 7D:
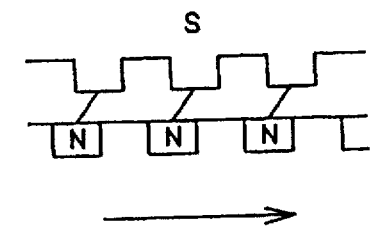

When the flow direction of the current supplied to the first coil 40A is changed to the direction shown in FIG. 4, the polarity of each pole tooth 32 is switched, as shown in FIG. 7C. When the first and second rotor sections 20A and 20B are located at the positions shown in FIG. 7C, they produce no torque. However, due to the inertial force produced in the state shown in FIG. 7A, the rotor 20 further rotates so that the permanent magnets 44 of the first rotor section 20A are offset from the pole teeth 32, as shown in FIG. 7D. As a result, attractive forces are produced between pole teeth 32 of the stator 30 which have been polarized into N poles and the core 20a of the first rotor section 20A, while repulsive forces are produced between the pole teeth 32 and the permanent magnets 44 of the first rotor section 20A. At this time, attractive forces are produced between pole teeth 32 which have been magnetized into S poles and the second rotor section 20B. Thus, the rotor 20 produces a driving force in the rightward direction.

Figure 7E:
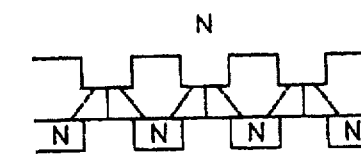
Figure 7E:
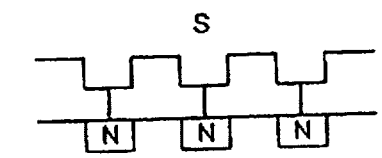
Figure 7F:
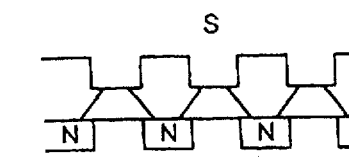
Figure 7F:
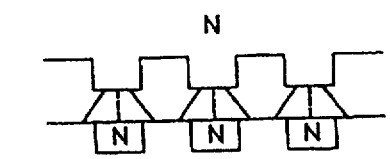

As a result of the attractive and repulsive forces produced at the first rotor section 20A and the attractive forces produced at the second rotor section 20B, the rotor 20 moves to a position where the pole teeth 32 of the stator 30 face the permanent magnets 44 of the second rotor section 20B, as shown in FIG. 7E. At this time, the first rotor section 20A rotates together with the second rotor section 20B to a position where the permanent magnets 44 of the first rotor section 20A are offset from the pole teeth by ½ pitch. In other words, when the flow direction of the current supplied to the first coil 40A is changed from the direction shown in FIG. 5 to the direction shown in FIG. 4, the rotor 20 rotates by an amount corresponding to ½ pitch. Subsequently, the flow direction of the current supplied to the first coil 40A is changed to so as to magnetize the stator 30 as shown in FIG. 7F, the rotor 20 further rotates by an amount corresponding to ½ pitch.

Figure 8:
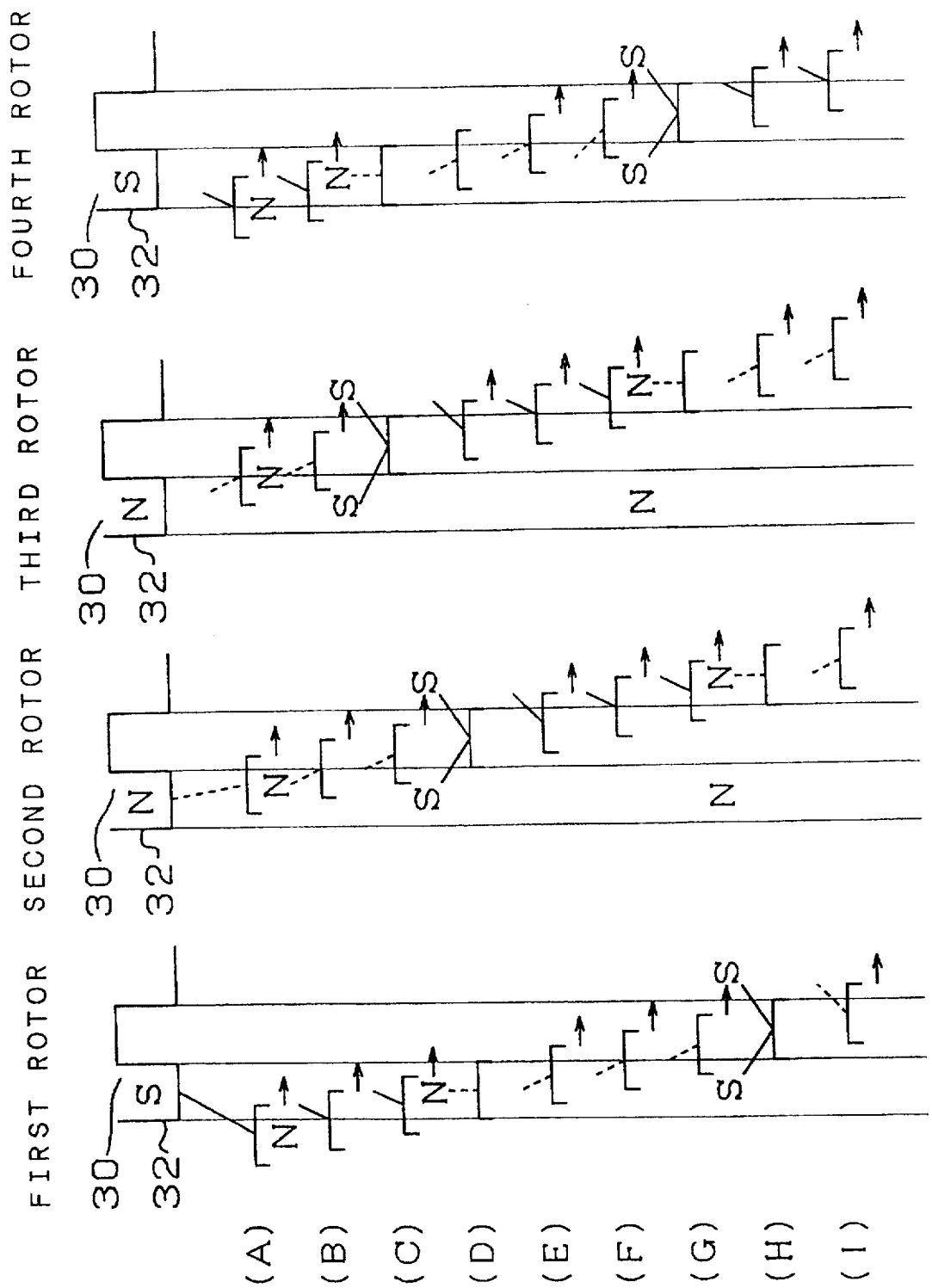
FIG. 8 is an explanatory diagram showing forces generated in the stepping motor according to the first embodiment.
Figure 9A:
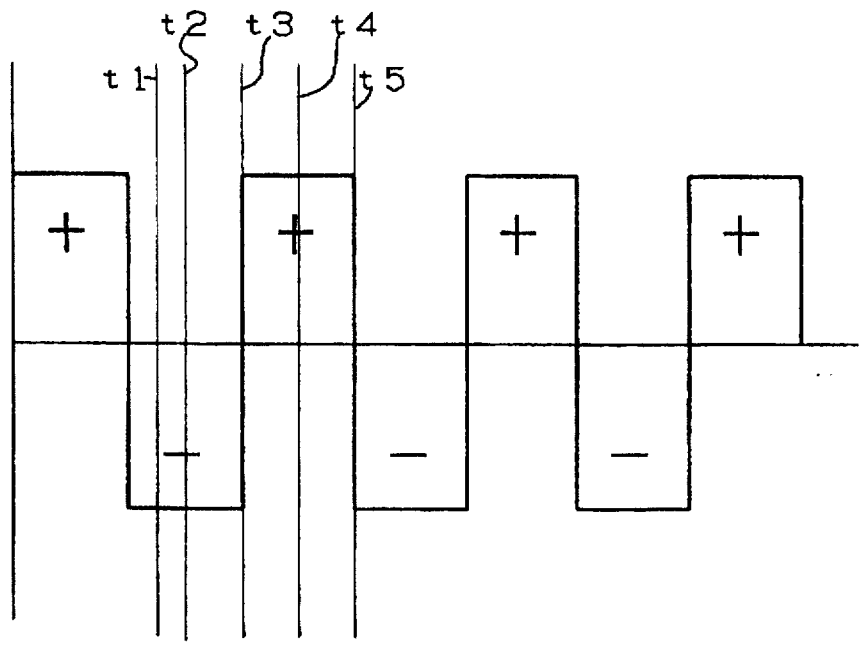

In the stepping motor 10 according to the first embodiment, since the first and second rotor sections 20A and 20B are collectively offset from the third and fourth rotor sections 20C and 20D by a quarter of the pitch of the permanent magnets 44, as described above, the rotor 20 can be rotated in a constant direction. Next, referring to FIG. 8, a description will be given of the principle of operation. In FIG. 8, attractive forces produced between the pole teeth 32 of the stator 30 and the cores 20a–20d of the rotor sections 20A–20D are not depicted, and no description will be given of the attractive forces in the following description. Before starting the description regarding the principle of operation, switching of the exciting direction will be described with reference to both FIG. 9A, which shows timing of changing the direction of current supplied to the first coil 40A, and FIG. 9B, which shows timing of changing the direction of current supplied to the second coil 40B. The flow direction of the current supplied to the first coil 40A magnetizing a portion of the stator 30 facing the first and second rotor sections 20A and 20B and the flow direction of the current supplied to the second coil 40B magnetizing a portion of the stator 30 facing the third and fourth rotor sections 20C and 20D are changed such that a phase difference of a ¼ period is produced therebetween so as to correspond to the amount of mechanical shift (¼ pitch) between the second rotor section 20B and the third rotor section 20C, as shown in FIGS. 9A and 9B.

First, a description will be given of an operation wherein currents are supplied to the first and second coils 40A and 40B in the respective directions shown in FIG. 5. This is a state at time t1 in FIGS. 9A and 9B. When each permanent magnet 44 of the first rotor section 20A delays with respect to the portion of the corresponding tooth 32 of the stator 30 which faces the first rotor section 20A and which has been magnetized with an S pole orientation, as shown in rows (A) and (B) of FIG. 8, attractive forces are produced between the pole teeth 32 and the permanent magnets 44 of the first rotor section 20A. In the drawings, attractive forces are indicated by solid lines. At this time, the portion of each pole tooth 32 of the stator 30 facing the second rotor section 20B has been magnetized with an N pole orientation. Since the second rotor section 20B is offset from the first rotor section 20A by ½ pitch, each permanent magnet 44 of the second rotor section 20B advances with respect to the corresponding pole tooth 32. Therefore, a repulsive force is generated between each permanent magnet 44 and the portion of the corresponding pole tooth 32 of the stator 30 which has been magnetized with an N pole orientation. In the drawings, repulsive forces are indicated by broken lines.

Figure 9B:
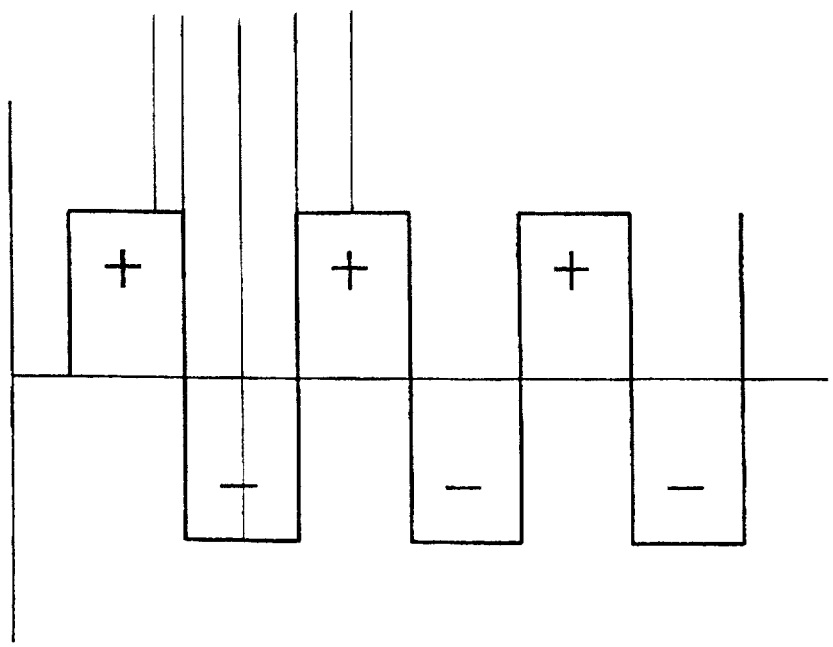

At this time, the flow direction of the current supplied to the second coil 40B is opposite to that of the current supplied to the first coil 40A, as shown in FIG. 9B. As a result, the portion of each pole tooth 32 of the stator 30 facing the third rotor section 20C is magnetized with an N pole orientation. Since the third rotor section 20C is offset from the second rotor section 20B by ¼ pitch, each permanent magnet 44 of the third rotor section 20C advances with respect to the corresponding pole tooth 32. Therefore, a repulsive force is generated between each permanent magnet 44 of the third rotor section 20C and portion of the corresponding pole tooth 32 of the stator 30 which has been magnetized with an N pole orientation. Also, the portion of each pole tooth 32 of the stator 30 facing the fourth rotor section 20D has been magnetized with an S pole orientation. Since the fourth rotor section 20D is offset from the third rotor section 20C by ½ pitch, each permanent magnet 44 of the fourth rotor section 20D advances further with respect to the corresponding pole tooth 32, as compared with those permanent magnets 44 in the third rotor section 30C. Therefore, a succeeding permanent magnet 44 faces the corresponding pole tooth 32 but delays therefrom. Therefore, an attractive force is generated between each permanent magnet 44 and the portion of the corresponding pole tooth 32 of the stator 30 which has been magnetized with an S pole orientation. The driving forces of the first through fourth rotor sections 20A–20D are combined to rotate the rotor 20 in the rightward direction, as shown in FIG. 8.

Subsequently, the direction of flow of the current supplied to the second coil 40B is changed at time t2, as shown in FIG. 9B. At this time, each permanent magnet 44 of the third rotor section 20C is offset from the corresponding pole tooth 32 by 1¼ pitch, i.e., is located between two adjacent pole teeth 32, while each permanent magnet 44 of the fourth rotor section 20D faces the corresponding pole tooth 32, as shown in row (C) of FIG. 8. Therefore, driving force is generated neither at the third rotor section 20C nor at the fourth rotor section 20D. Meanwhile, the first and second rotor sections 20A and 20B continue the generation of rightward driving force, as shown in FIG. 8. Therefore, the rotor 20 continuously receives the rightward drive force.

Further, the direction of flow of the current supplied to the first coil 40A is changed at time t3, as shown in FIG. 9A. At this time, as shown in row (D) of FIG. 8, each permanent magnet 44 of the first rotor section 20A faces the corresponding pole tooth 32, while each permanent magnet 44 of the second rotor section 20B is located between two adjacent pole teeth 32. Therefore, driving force is generated neither at the first rotor section 20A nor at the second rotor section 20B. Meanwhile, the third and fourth rotor sections 20C and 20D continue the generation of rightward driving force, as shown in FIG. 8. Therefore, the rotor 20 continuously receives the rightward drive force.

In the states shown in rows (E) and (F) of FIG. 8, each of the first through fourth rotor sections 20A–20D generates a rightward driving force. These states correspond to a period from time t3 to time t4 in FIGS. 9A and 9B. Subsequently, the direction of flow of the current supplied to the second coil 40B is changed at time t4, as shown in FIG. 9B. At this time, as shown in row (G) of FIG. 8, each permanent magnet 44 of the third rotor section 20C faces the corresponding pole tooth 32, while each permanent magnet 44 of the fourth rotor section 20D is located between two adjacent pole teeth 32. Therefore, driving force is generated neither at the third rotor section 20C nor at the fourth rotor section 20D. Meanwhile, the first and second rotor sections 20A and 20B continue the generation of rightward driving force, as shown in FIG. 8.

Further, the direction of flow of the current supplied to the first coil 40A is changed at time t5, as shown in FIG. 9A. At this time, each permanent magnet 44 of the first rotor section 20A is located between two adjacent pole teeth 32, while each permanent magnet 44 of the second rotor section 20B faces the corresponding pole tooth 32, as shown in row (H) of FIG. 8. Therefore, driving force is generated neither at the first rotor section 20A nor at the second rotor section 20B. Meanwhile, the third and fourth rotor sections 20C and 20D continue the generation of rightward driving force, as shown in FIG. 8. Therefore, the rotor 20 continuously receives the rightward driving force.

In the above-described stepping motor 10 according to the first embodiment, an offset of ¼ pitch is present between the collective first and second rotor sections 20A and 20B and the collective third and fourth rotor sections 20C and 20D. Accordingly, a driving force in the same direction can be generated constantly regardless of the angular position of the rotor 20. This makes it possible to rotate the rotor 20 in a constant direction for startup, regardless of the position where the rotor 20 is stopped before the startup. By reversing the timing of starting current supply to the first coil 40A and the timing of starting current supply to the second coil 40B, it is possible to generate a leftward driving force; i.e., to rotate the rotor 20 in the reverse direction.

Figure 10A:
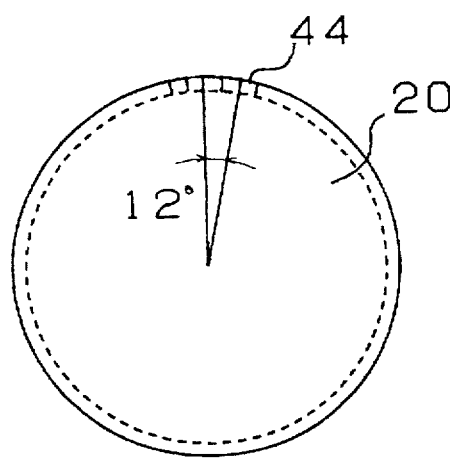
Figure 10B:
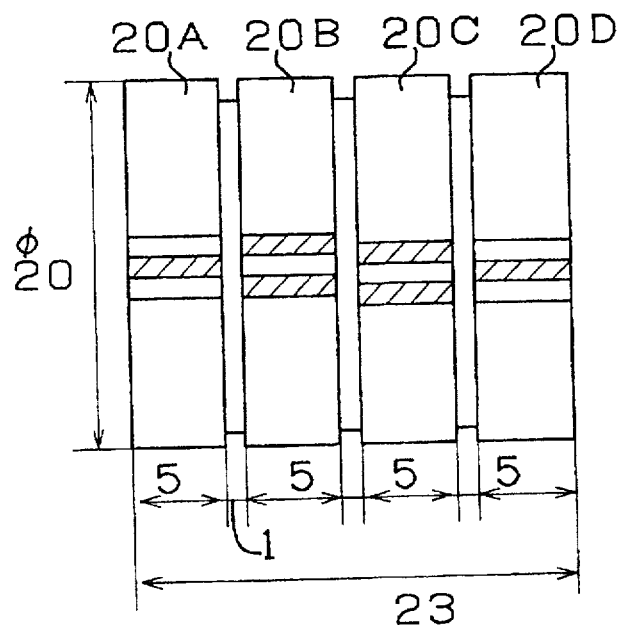
Figure 10C:
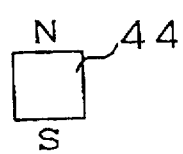
Figure 10D:
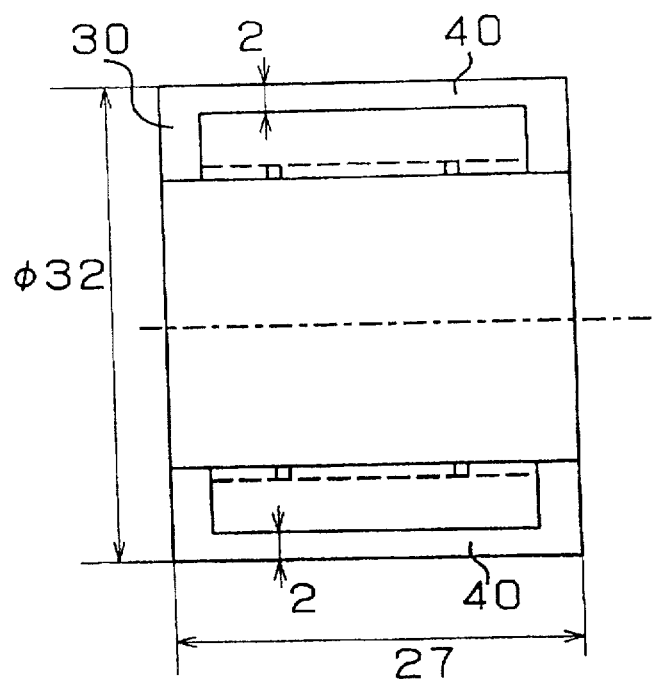

Next, referring to FIGS. 10A–10D, a description will be given of the design dimensions of the stepping motor 10 of the first embodiment. FIG. 10A shows a side view of the rotor 20. The rotor 20 has an outer diameter of 20 mm (more accurately, 19.0986 mm). On the outer circumferential surface are mounted thirty permanent magnets 44 at a pitch angle of 12°. FIG. 10B shows a front view of the rotor 20. Each of the first through fourth rotor sections 20A–20D has a width of 5 mm, and a spacing of 1 mm exists between each pair of adjacent rotor sections. Therefore, the overall width of the rotor 20 is 23 mm. FIG. 10C shows a front view of one of the permanent magnets 44. Each permanent magnet 44 has a substantially rectangular shape, and is mounted to the rotor 20 such that its N pole faces outward in the radial direction, as has been described with reference to FIG. 2. FIG. 10D shows a front view-of the stator 30. The stator 30 has an outer diameter of 32 mm and a width of 27 mm. The thickness of each of the coils 40A and 40B in the radial direction is 2 mm.

Through calculation for obtaining the generation torque of the stepping motor 10 according to the first embodiment, it was found that the stepping motor 10 can generate a torque about four times that of a conventional stepping motor. This comparison was made based on the torque generated per unit surface area.

As has been described with reference to FIGS. 7A–7F and FIG. 8, in the stepping motor 10 according to the first embodiment, an attractive force and/or a repulsive force is generated at each of the permanent magnets 44 disposed in the outer circumferential surface of the rotor 20, and when the outer end of each permanent magnet 44 has the same polarity as that of a pole tooth 32 facing the magnet 44, an attractive force is also produced between the pole tooth 32 and the corresponding core 20a, 20b, 20c, or 20d of the rotor 20. These forces are combined to generate a driving force, so that a larger torque can be produced, as compare with that of a conventional stepping motor in which a torque is generated utilizing an attractive force generated between a group of pole teeth corresponding to one of a plurality of phases and the pole teeth of the stator. In the conventional stepping motor, since coils are wound around each pole tooth of the stator, it is difficult to wind the coils using a machine. In contrast, in the stepping motor according to the present embodiment, the coils 40A and 40B, which have previously been wound in a looped shape, are fit into the grooves 34 of the stator 30. Therefore, the coils can be easily wound using a machine. In the conventional stepping motor, since the coils are wound around the pole teeth of the stator, the pole pitch of the stator cannot be decreased. Therefore, the conventional stepping motor has a large space which cannot be utilized to generate rotational torque. In contrast, in the stepping motor 10 according to the present embodiment, since the coils 40A and 40B are wound in the circumferential direction of the stator 30, the pitch of the pole teeth 32 can be decreased so as to reduce the size of the stepping motor 10. Accordingly, it becomes possible to directly drive, without using a reducer, a finger joint, etc., of a robot hand, which have conventionally been driven using stepping motors, each of which includes a reducer.

Figure 11:
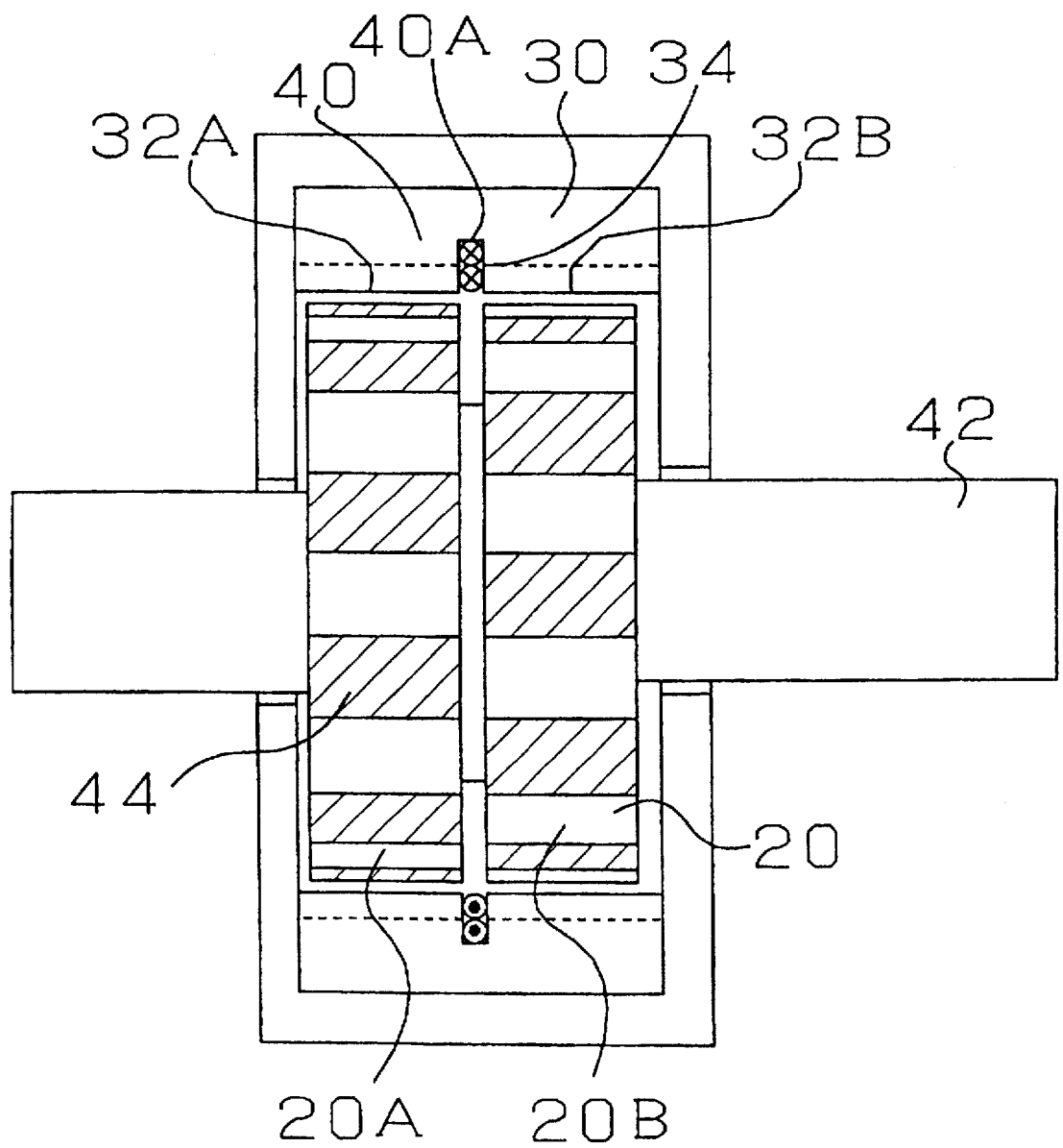
FIG. 11 is a cutaway side view of a stepping motor according to a second embodiment of the present invention.

Next, a second embodiment of the present invention will be described with reference to FIG. 11. Components corresponding to those used in the first embodiment are denoted by the same reference numbers, and descriptions therefor will be omitted in the following description.

In the stepping motor 10 of the first embodiment, which has been described with reference to FIG. 2, the rotor 20 has four rotor sections, i.e., the first through fourth rotor sections 20A–20D. In the second embodiment, the rotor 20 has two rotor sections, i.e., first and second rotor sections 20A and 20B. Although in the second embodiment, the width of the rotor 20 can be reduced to one half that of the first embodiment so as to reduce the size of the stepping motor, the rotor 20 of the second embodiment can not be started by itself, and its rotational direction at the startup cannot be controlled. These problems occur when the rotor 20 is stopped at certain positions. Therefore, a mechanism for preventing reverse rotation, such as a ratchet mechanism, is provided. Alternatively, the stepping motor of the second embodiment is used as an auxiliary drive mechanism which is not required to start by itself.

Figure 12:
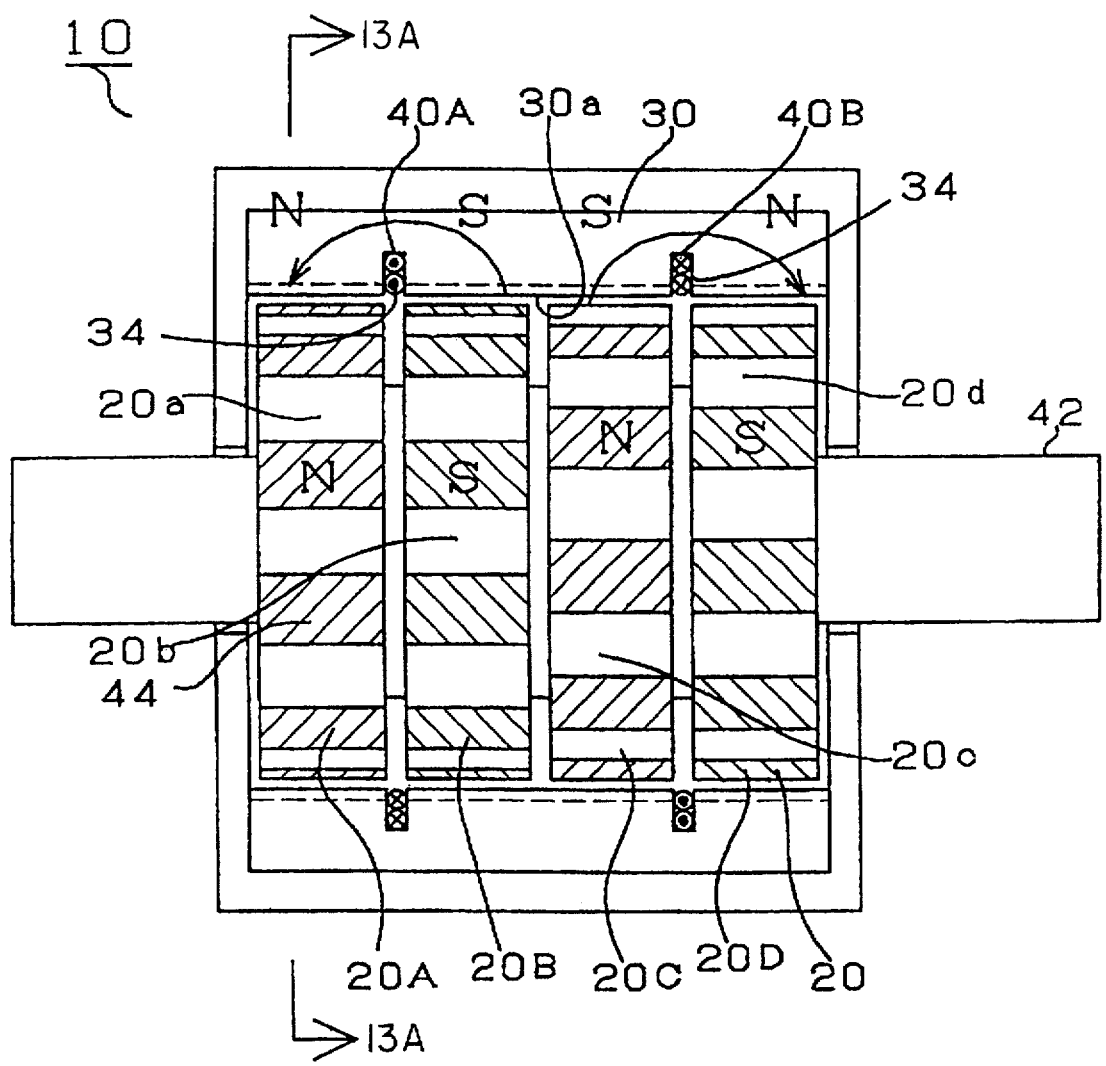
FIG. 12 is a cutaway side view of a stepping motor according to a third embodiment of the present invention.

Next, a third embodiment of the present invention will be described with reference to FIG. 12. Components corresponding to those used in the first embodiment are denoted by the same reference numbers, and descriptions therefor will be omitted in the following description.

In the stepping motor 10 of the first embodiment, all the permanent magnets 44 are disposed on the surface of the rotor such that their N poles face outward. In contrast, in the third embodiment, the permanent magnets 44 of the first and third rotor sections 20A and 20C are disposed on the surface of the rotor such that their N poles face outward, while the permanent magnets 44 of the second and fourth rotor sections 20B and 20D are disposed on the surface of the rotor such that their S poles face outward. In the first embodiment, an offset of ½ pitch exists between the first rotor section 20A and the second rotor section 20B. In the third embodiment, offset is provided neither between the first and second rotor sections 20A and 20B nor between the third and fourth rotor sections 20C and 20D. However, an offset of ¼ pitch is provided between the collective first and second rotor sections 20A and 20B and the collective third and fourth rotor sections 20C and 20D, i.e., between the second rotor section 20B and the third rotor section 20C.

The operation of the stepping motor according to the third embodiment will now be described. When currents are supplied to the first and second coils 40A and 40B in the respective directions shown in FIG. 12, counterclockwise magnetic fluxes are produced around the first coil 40A so that the portion of the stator 30 facing the first rotor section 20A is magnetized with an N pole orientation, and the portion of the stator 30 facing the second rotor section 20B is magnetized with an S pole orientation. Similarly, clockwise magnetic fluxes are produced around the second coil 40B so that the portion of the stator 30 facing the third rotor section 20C is magnetized with an S pole orientation, and the portion of the stator 30 facing the fourth rotor section 20D is magnetized with an N pole orientation.

When the portion of the stator 30 facing the first rotor section 20A is magnetized with an N pole orientation and the portion of the stator 30 facing the second rotor section 20B is magnetized with an S pole orientation, repulsive forces are produced at the first rotor section 20A in which the N poles of the permanent magnets 44 are oriented outward, as well as at the second rotor section 20B in which the S poles of the permanent magnets 44 are oriented outward. Moreover, as in the stepping motor of the first embodiment, attractive forces are produced between the portions of the stator 30 facing the first and second rotor sections 20A and 20B, respectively, and the cores 20a and 20b of the first and second rotor sections 20A and 20B. When the portion of the stator 30 facing the third rotor section 20C is magnetized with an S pole orientation and the portion of the stator 30 facing the fourth rotor section 20B is magnetized with an N pole orientation, attractive forces are produced at the third rotor section 20C in which the N poles of the permanent magnets 44 are oriented outward, as well as at the fourth rotor section 20D in which the S poles of the permanent magnets 44 are oriented outward. The driving forces produced at the first through fourth rotor sections 20A– 20D are combined to drive the rotor 20.

When the directions of the currents supplied to the first and second coils 40A and 40B are switched after the rotor 20 has rotated over an angle corresponding to ½ pitch, the portions of the stator 30 facing the first through fourth rotor sections 20A–20D are magnetized with pole orientations opposite to those in the above-described state. As a result, attractive forces are produced at the first and second rotor sections 20A and 20B while repulsive forces are produced at the third and fourth rotor sections 20C and 20D. Further, the portions of the stator 30 facing the third and fourth rotor sections 20C and 20D attract the cores 20c and 20d of the third and fourth rotor sections 20C and 20D. These driving forces produced at the first through fourth rotor sections 20A–20D are combined to continue the rotation of the rotor 20. Since an offset of ¼ pitch is provided between the collective first and second rotor sections 20A and 20B and the collective third and fourth rotor sections 20C and 20D, i.e., between the second rotor section 20B and the third rotor section 20C, a driving force can be constantly generated regardless of the angular position of the rotor 20. Further, the stepping motor can be started by itself.

The structure of the third embodiment facilitates the assembly of the plurality of rotor sections.

Figure 13A:
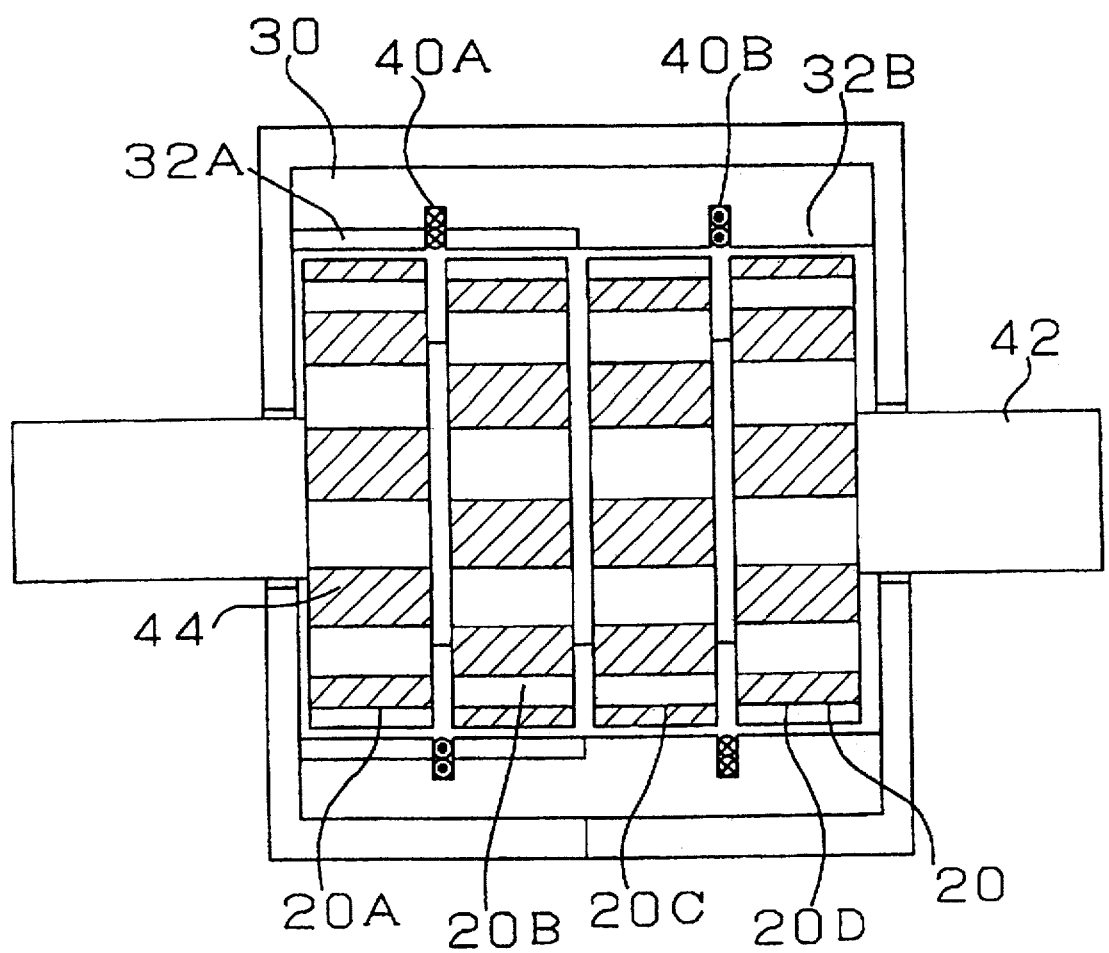
Figure 13B:
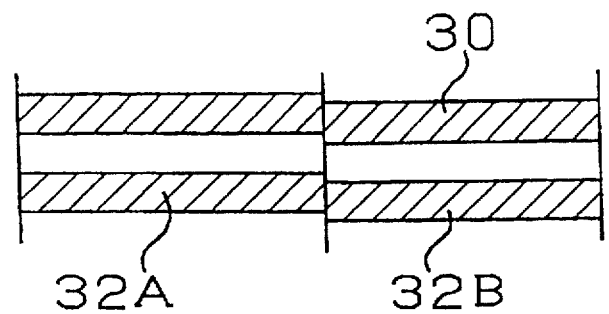

Next, a fourth embodiment of the present invention will be described with reference to FIGS. 13A and 13B. FIG. 13A shows a sectional view of a stepping motor according to the fourth embodiment, while FIG. 13B shows pole teeth 32A and 32B of the stator 30 as viewed from the rotor 20.

In the stepping motor 10 of the first embodiment which has been described with reference to FIG. 2, an offset of ¼ pitch is provided between the first and second rotor sections 20A and 20B and the third and fourth rotor sections 20C and 20D, i.e., between the second rotor section 20B and the third rotor section 20C. In the stepping motor 10 of the fourth embodiment, no offset is provided between the second rotor section 20B and the third rotor section 20C, as shown in FIG. 13A. Instead, an offset corresponding to a quarter of the pitch of the permanent magnets 44 is provided between the pole teeth 32A facing the first and second rotor sections 20A and 20B and the pole teeth 32B facing the third and fourth rotor sections 20C and 20D, as shown in FIG. 13B. As in the first embodiment, all the permanent magnets 44 are disposed on the surface of the rotor such that their N poles face outward.

In the stepping motor of the fourth embodiment, since the poleteeth 32A and the pole teeth 32B are offset from each other by an amount corresponding to ¼ pitch, its rotor 20 rotates in the same manner as in the stepping motor of the first embodiment, in which an offset of ¼ pitch is provided between the second rotor section 20B and the third rotor section 20C. The stepping motor of the fourth embodiment has an advantage that the plurality of rotor sections can be assembled easily.

Figure 14:
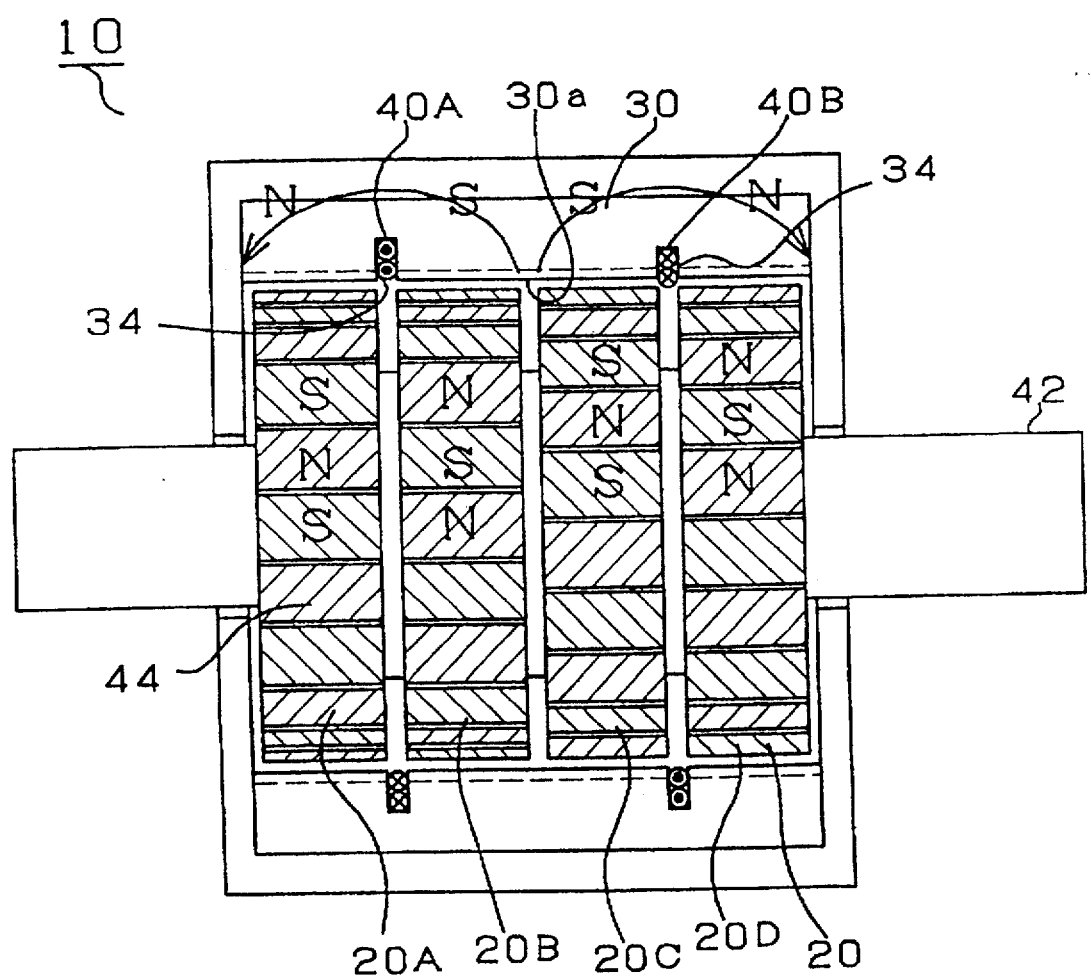
FIG. 14 is a cutaway side view of a stepping motor according to a fifth embodiment of the present invention.

Next, a fifth embodiment of the present invention will be described with reference to FIG. 14. Components corresponding to those used in the first embodiment are denoted by the same reference numbers, and descriptions therefor will be omitted in the following description.

In the stepping motors 10 of the first through fourth embodiments, the permanent magnets 44 are embedded in the surface of the rotor 20 such that the magnets 44 and the surface portions of the core having the same pitch of the magnets 44 are disposed in an alternating manner. In the fifth embodiment, the permanent magnets 44 are disposed on the entire circumferential surface of the rotor 20, such that S poles and N poles are formed alternately in the circumferential direction. This structure is considered to generate a torque larger than those generated by the stepping motors of the first through fourth embodiments.

Figure 15:
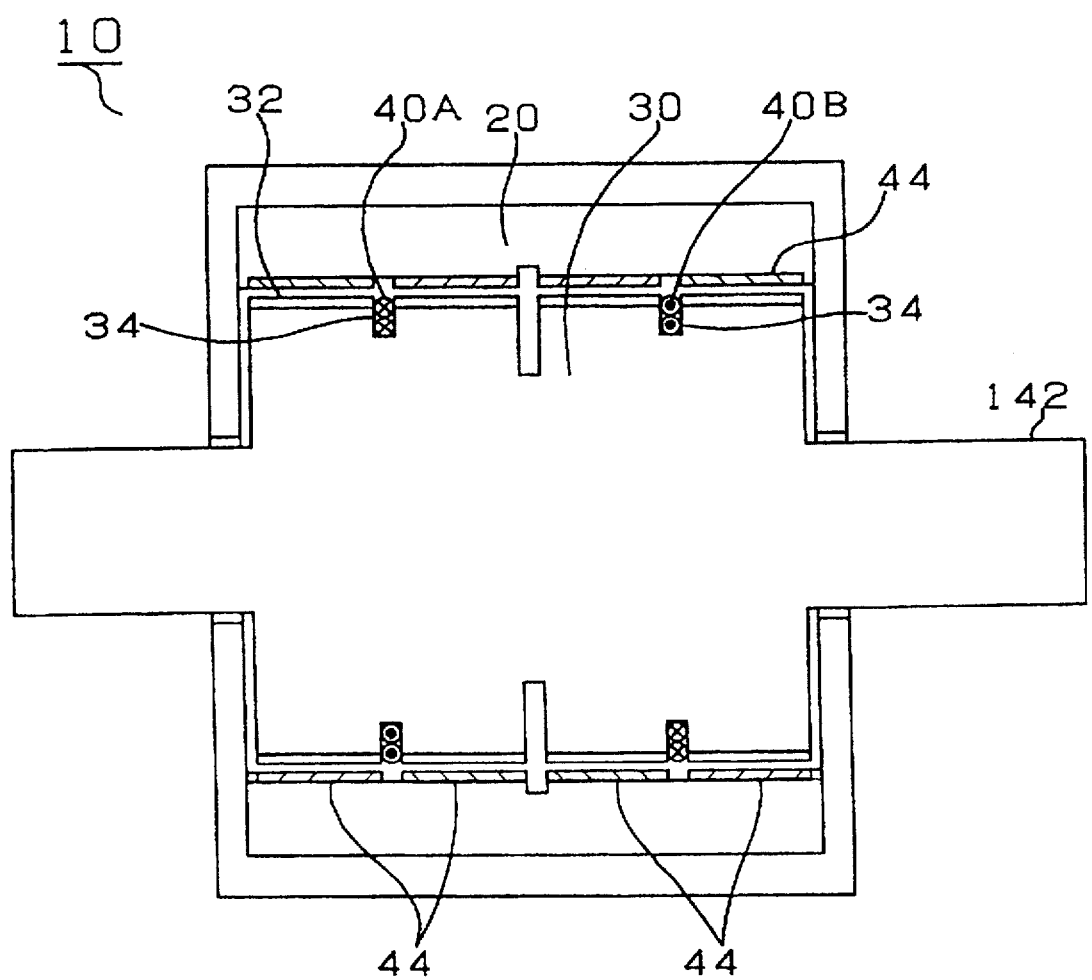
FIG. 15 is a cutaway side view of a stepping motor according to a sixth embodiment of the present invention.

Next, a sixth embodiment of the present invention will be described with reference to FIG. 15.

In the stepping motors 10 of the first through fourth embodiments, the rotor 20 is disposed inside the stator 30. In the stepping motor 10 according to the sixth embodiment, the stator 30 is disposed inside the rotor 20. This configuration is called an "inner-stator outer-rotor type". The stator 30 is supported by a support member 142, and the rotor 20 rotates around the stator 30. The permanent magnets 44 and the pole tooth 32 are disposed in the same manner as in the first embodiment. However, the arrangement of the permanent magnets 44 and the pole teeth 32 may be modified as in the second through fifth embodiments.

As has been described with reference to the first through sixth embodiments, in the stepping motor according to the present invention, its rotating operation can be performed by providing therein two or more rotor sections. The stepping motor can be started by itself when three or more rotor sections are provided and offsets are properly provided between them. In the first embodiment, an offset of ½ pitch is provided between the first rotor section 20A and the second rotor section 20B, while an offset of ¼ pitch is provided between the second rotor section 20B and the third rotor section 20C. However, these offset values may be changed. In the first, second and fourth embodiments, the permanent magnets 44 are disposed such that their N poles face outward. However, the permanent magnets 44 may be disposed such that their S poles face outward. In the first through sixth embodiments, grooves 34 are formed so as to increase the torque. However, the grooves 34 may be omitted.

Obviously, numerous modifications and variations of the present invention are possible in light of the above teachings. It is therefore to be understood that within the scope of the appended claims, the present invention may be practiced otherwise than as specifically described herein.

What is claimed is:

1. A stepping motor comprising:

a stator;

a rotor having first and second rotor sections;

permanent magnets disposed at a constant pitch on an outer circumference or an inner circumference of each of said first and second rotor sections, said permanent magnets being arranged such that a same pole of respective of said magnets for respective of said first and second rotor sections faces radially toward said stator; and a coil provided in said stator and wound in a circumferential direction so as to generate looped magnetic fluxes in a plane containing an axis of said stator, a direction of current supplied to said coil being changed during operation, wherein a first interrelation exists between magnetic fluxes generated by permanent magnets of said first rotor section and magnetic fluxes generated in said stator by said coil, a second interrelation exists between magnetic fluxes generated by permanent magnets of said second rotor section and magnetic fluxes generated in said stator by said coil, and an offset in the rotational direction is provided between said first and said second interrelations.

2. A stepping motor according to claim 1, wherein said rotor is disposed inside said stator; said stator has a cylindrical shape for receiving said rotor and has a plurality of pole teeth which are formed at the inner circumference of said stator at a pitch equal to the pitch of said permanent magnets; and said permanent magnets are disposed on the outer circumference of each of said first and second rotor sections such that the same poles of said permanent magnets face outward.

3. A stepping motor according to claim 2, wherein said first interrelation is a first positional interrelation between said permanent magnets of said first rotor section and said pole teeth, while said second interrelation is a second positional interrelation between permanent magnets of said second rotor section and said pole teeth.

4. A stepping motor according to claim 3, wherein an offset in the rotational direction is provided between each permanent magnet of said first rotor section and a correspond permanent magnet of said second rotor section, whereby an offset is provided between said first and second positional interrelations.

5. A stepping motor according to claim 1, wherein said rotor is disposed so as to surround said stator; said stator has a plurality of pole teeth projecting from the outer circumference of said stator at a pitch equal to the pitch of said permanent magnets; and said permanent magnets are disposed on the inner circumference of each of said first and second rotor sections such that the same poles of said permanent magnet face inward.

6. A stepping motor according to claim 5, wherein said first interrelation is a first positional interrelation between said permanent magnets of said first rotor section and said pole teeth, while said second interrelation is a second positional interrelation between said permanent magnets of said second rotor section and said pole teeth.

7. A stepping motor according to claim 6, wherein an offset in the rotational direction is provided between each permanent magnet of said first rotor section and a correspond permanent magnet of said second rotor section, whereby an offset is provided between said first and second positional interrelations.

8. A stepping motor comprising:

a cylindrical stator having a plurality of pole teeth projecting from the inner circumference of said stator at a predetermined pitch;

a rotor having first, second, third and fourth rotor sections;

permanent magnets disposed on the outer circumference of each of said first through fourth rotor sections at a constant pitch, said permanent magnets being arranged such that a same pole of respective of said magnets for respective of said rotor sections face radially toward said stator;

first and second coils provided in said stator and wound in the circumferential direction so as to generate looped magnetic fluxes in a first portion of said stator facing said first and second rotor sections, and in a second portion of said stator facing said third and fourth rotor sections, the directions of currents supplied to said first and second coils being changed during operation, wherein a first offset in the rotational direction is provided between the magnetic interrelation between said permanent magnets of said first rotor section and said pole teeth and the magnetic interrelation between said permanent magnets of said second rotor section and said pole teeth, a second offset equal to the first offset is provided between the magnetic interrelation between said permanent magnets of said third rotor section and said pole teeth and the magnetic interrelation between said permanent magnets of said forth rotor section and said pole teeth, and a third offset in the rotational direction is provided between the magnetic interrelation between said permanent magnets of said second rotor section and said pole teeth and the magnetic interrelation between said permanent magnets of said third rotor section and said pole teeth.

9. A stepping motor according to claim 8, wherein said permanent magnets are disposed on the outer circumference of each of said first through fourth rotor sections at a pitch equal to the pitch of said pole teeth such that the same poles of said permanent magnets face outward, and wherein a first offset corresponding to one half of the pitch of the permanent magnets is provided between each permanent magnet of said first rotor section and a correspond permanent magnet of said second rotor section, a second offset equal to the first offset is provided between each permanent magnet of said third rotor section and a correspond permanent magnet of said fourth rotor section, and a third offset corresponding to a quarter of the pitch of the permanent magnets is provided between each permanent magnet of said second rotor section and a correspond permanent magnet of said third rotor section.

10. A stepping motor according to claim 8, wherein said permanent magnets of said first and third rotor sections are disposed at a pitch equal to the pitch of said pole teeth such that first poles of said permanent magnets face outward, and said permanent magnets of said second and fourth rotor sections are disposed at the pitch equal to the pitch of said pole teeth such that second poles of said permanent magnets face outward, and wherein an offset corresponding to a quarter of the pitch of the permanent magnets is provided between each permanent magnet of said second rotor section and a correspond permanent magnet of said third rotor section.

11. A stepping motor according to claim 8, wherein said permanent magnets are disposed on the outer circumference of each of said first through fourth rotor sections at a pitch equal to the pitch of said pole teeth such that the same poles of said permanent magnets face outward, wherein a first offset corresponding to one half of the pitch of the permanent magnets is provided between each permanent magnet of said first rotor section and a correspond permanent magnet of said second rotor section, a second offset equal to the first offset is provided between each permanent magnet of said third rotor section and a correspond permanent magnet of said fourth rotor section, and a third offset corresponding to a quarter of the pitch of the permanent magnets is provided between a first half of each pole tooth and a second half of the pole tooth.

12. A stepping motor according to claim 8, wherein said permanent magnets of said first and second rotor sections are disposed at a pitch equal to one half of the pitch of said pole teeth such that first and second poles of said permanent magnets face outward in an alternating manner, and wherein a first offset corresponding to one half of the pitch of the pole teeth is provided between each permanent magnet of said first rotor section and a correspond permanent magnet of said second rotor section, a second first offset equal to the first offset is provided between each permanent magnet of said third rotor section and a correspond permanent magnet of said fourth rotor section, and a third offset corresponding to a quarter of the pitch of the pole teeth is provided between each permanent magnet of said second rotor section and a correspond permanent magnet of said third rotor section.

13. A stepping motor comprising:

a stator having a plurality of pole teeth projecting from the outer circumference of said stator at a predetermined pitch;

a rotor having first, second, third and fourth rotor sections;

permanent magnets disposed on the inner circumference of each of said first through fourth rotor sections at a pitch equal to the pitch of said pole teeth such that the same poles of said permanent magnets face inward;

first and second coils provided in said stator and wound in the circumferential direction so as to generate looped magnetic fluxes in a first portion of said stator facing said first and second rotor sections, and in a second portion of said stator facing said third and fourth rotor sections, the directions of currents supplied to said first and second coils being changed during operation, wherein a first offset in the rotational direction is provided between each permanent magnet of said first rotor section and a correspond permanent magnet of said second rotor section, a second offset equal to the first offset is provided between each permanent magnet of said third rotor section and a correspond permanent magnet of said fourth rotor section, and a third offset in the rotational direction is provided between each permanent magnet of said second rotor section and a correspond permanent magnet of said third rotor section.

* * * * *